(12) United States Patent
Tapia et al.

(10) Patent No.: US 9,571,996 B2
(45) Date of Patent: Feb. 14, 2017

(54) PACKET-SWITCHED CORE NETWORK ARCHITECTURE FOR VOICE SERVICES ON SECOND- AND THIRD-GENERATION WIRELESS ACCESS NETWORKS

(71) Applicant: T-Mobile USA, Inc., Bellevue, WA (US)

(72) Inventors: Pablo Tapia, Snoqualmie, WA (US); Christopher Harvey Joul, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 391 days.

(21) Appl. No.: 14/326,378

(22) Filed: Jul. 8, 2014

(65) Prior Publication Data

US 2014/0321456 A1    Oct. 30, 2014

Related U.S. Application Data

(62) Division of application No. 13/041,302, filed on Mar. 4, 2011, now Pat. No. 8,774,167.

(51) Int. Cl.
*H04W 4/18* (2009.01)
*H04W 88/18* (2009.01)
(Continued)

(52) U.S. Cl.
CPC ............. *H04W 4/18* (2013.01); *H04W 88/18* (2013.01); *H04M 15/24* (2013.01); *H04M 15/39* (2013.01);
(Continued)

(58) Field of Classification Search
None
See application file for complete search history.

(56) References Cited

U.S. PATENT DOCUMENTS 6,957,042 B2   10/2005   Williams
7,492,757 B2   2/2009   Huang
(Continued)

FOREIGN PATENT DOCUMENTS

WO    WO-20120122055    9/2012

OTHER PUBLICATIONS

International Searching Authority, International Search Report and Written Opinion, International Application PCT/US2012/027598, mailed Oct. 4, 2012, 9 pages.
(Continued)

*Primary Examiner* — Anh Ngoc Nguyen
(74) *Attorney, Agent, or Firm* — Perkins Coie LLP

(57) ABSTRACT

Communications systems and methods with an evolved packet-switched core network architecture to enable voice services on second- and third-generation wireless access networks. The systems and methods permit unmodified 2G and 3G mobile devices to conduct voice calls using conventional circuit-switched user-plane and control-plane protocols at the air interface while the voice calls are switched at the back-end using a packet-switched core network. The system may include a translation module at a controller component that is configured to provide both user-plane and control-plane translation functions between an unmodified 2G/3G mobile device that utilizes circuit-switched protocols for a voice call and the packet-switched core network that utilizes packet-switched protocols to switch the voice call.

20 Claims, 5 Drawing Sheets

(51) Int. Cl.
 H04W 4/24       (2009.01)
 H04W 76/00      (2009.01)
 H04W 84/04      (2009.01)
 H04W 92/02      (2009.01)
 H04M 15/24      (2006.01)
 H04M 15/00      (2006.01)

(52) U.S. Cl.
 CPC ............. *H04M 15/41* (2013.01); *H04M 15/43* (2013.01); *H04M 15/63* (2013.01); *H04M 2215/20* (2013.01); *H04W 4/24* (2013.01); *H04W 76/00* (2013.01); *H04W 84/042* (2013.01); *H04W 92/02* (2013.01)

(56) References Cited

U.S. PATENT DOCUMENTS

| | | | |
|---|---|---|---|
| 8,620,264 B2* | 12/2013 | Hicks | H04M 15/00 379/114.22 |
| 8,774,167 B2 | 7/2014 | Tapia et al. | |
| 2002/0110104 A1 | 8/2002 | Surdila et al. | |
| 2004/0029615 A1 | 2/2004 | Gerry et al. | |
| 2004/0258047 A1 | 12/2004 | Miao | |
| 2006/0268781 A1 | 11/2006 | Svensson et al. | |
| 2007/0064886 A1* | 3/2007 | Chiu | H04L 29/06027 379/88.17 |
| 2008/0267199 A1 | 10/2008 | Smith et al. | |
| 2008/0304462 A1 | 12/2008 | Burgess et al. | |
| 2008/0316976 A1 | 12/2008 | Thompson et al. | |
| 2009/0005048 A1 | 1/2009 | Bae et al. | |
| 2010/0216439 A1* | 8/2010 | Marcelli | H04M 15/00 455/414.1 |

OTHER PUBLICATIONS

European Patent Office, Extended European Search Report, EP Patent Application 12755236.2, mailed Jul. 30, 2014, 6 pages.

* cited by examiner

PACKET-SWITCHED CORE NETWORK ARCHITECTURE FOR VOICE SERVICES ON SECOND- AND THIRD-GENERATION WIRELESS ACCESS NETWORKS

CROSS-REFERENCES TO RELATED APPLICATIONS

This application is a divisional application of U.S. patent application Ser. No. 13/041,302, filed on Mar. 4, 2011, now U.S. Pat. No. 8,774,167, and entitled "PACKET-SWITCHED CORE NETWORK ARCHITECTURE FOR VOICE SERVICES ON SECOND-AND THIRD-GENERATION WIRELESS ACCESS NETWORKS," which is hereby incorporated herein in its entirety by reference.

BACKGROUND

Third-Generation Partnership Project (3GPP) Long Term Evolution (LTE) is a new standard mobile network technology that uses only packet-switched (PS) protocols, including at the radio or air interface. It has been posited that the simplified architecture of LTE systems will reduce operating expenses for mobile service providers. Increasingly, mobile service providers are integrating LTE networks with pre-existing second-generation (2G) and third-generation (3G) networks that utilize a combination of circuit-switched (CS) and packet-switched protocols, such as Global System for Mobile Communications (GSM), General Packet Radio Service (GPRS), Enhanced Data Rates for GSM Evolution (EDGE), and Universal Mobile Telecommunications System (UMTS) networks. For example, both GSM and UMTS networks utilize circuit-switched protocols for voice services.

Mobile service providers may find it difficult to gracefully transition to LTE technologies because they must continue to support legacy 2G/3G hardware in which the service provider or its customers invested, even after new LTE infrastructure is deployed. For example, service providers will need to continue to support customers who have legacy 2G/3G mobile devices that are not capable of interacting with LTE radio access networks. Additionally, service providers may continue to maintain their 2G/3G radio access networks for some period of time before fully replacing them with LTE radio access networks, since these legacy networks represent a substantial prior capital investment.

In existing approaches, the legacy circuit-switched core network architecture must be maintained to support voice calls conducted using legacy 2G/3G mobile devices and 2G/3G radio access networks. Furthermore, the 3GPP has suggested that in order to interface LTE subsystems with 2G/3G subsystems, voice calls between a mobile device on an LTE subsystem and a mobile device on a 2G/3G subsystem should be circuit-switched by the circuit-switched core network of the 2G/3G subsystem. The suggested approach would require that mobile service providers indefinitely maintain two separate core networks: the legacy circuit-switched core network and a packet-switched core network. Maintaining two separate core networks leads to increased operating and capital expenses. Service providers could realize savings in their operating and capital expenses if 2G/3G circuit-switched core network hardware could be gracefully decommissioned.

One previous approach to eliminate a circuit-switched core network is described in U.S. Patent Application Publication No. 2004/0029615, titled "Transmission of Voice Over Packet-Switched Systems," PCT No. PCT/EP01/11164, filed Sep. 10, 2001, the entirety of which is incorporated herein by reference. In the previous approach, transmission of voice over Internet Protocol (IP) is performed in a UMTS system by using a hybrid mode of attach where the speech bearer path from the mobile device is transported to the network controller in circuit-switched mode and from there onwards in packet-switched mode. The control signaling from the mobile device is sent over IP to the core network. Unfortunately, in the previous approach, the mobile device must be capable of generating and interpreting session initiation protocol (SIP) signaling messages, e.g., via an installed SIP architecture or application. Thus, unmodified 2G/3G mobile devices that do not include a SIP application may not utilize the previous approach.

DETAILED DESCRIPTION

Described herein are communications systems with an evolved packet-switched core network architecture for voice services on second- and third-generation wireless access networks and related methods. The systems and methods permit unmodified 2G and 3G mobile devices to conduct voice calls using conventional circuit-switched user-plane and control-plane protocols at the air interface while the voice calls are switched at the back-end using a packet-switched core network. As described in greater detail herein, since the packet-switched core network manages both control-plane signaling and user-plane data for 2G/3G voice calls using a packet-switched core network, there is no need to maintain a legacy circuit-switched core network. Thus, the systems and methods described herein may reduce capital and operating expenses. Furthermore, by moving 2G/3G voice calls off of dedicated circuits and onto Voice-Over-IP (VOIP) or similar packet-switched services, the systems and methods may provide greater efficiency and capacity than conventional 2G/3G technologies.

As described herein, the system includes a translation module at a controller component. The translation module is configured to provide both user-plane and control-plane translation functions between an unmodified 2G/3G mobile device that utilizes circuit-switched protocols for a voice call and the packet-switched core network that utilizes packet-switched protocols to switch the voice call. Since the translation module provides the interworking needed between the packet-switched and circuit-switched modes, the methods described herein may be entirely transparent to the mobile devices. Therefore, the methods described herein may be implemented even with unmodified 2G/3G mobile devices that are incapable of providing SIP-based control of a voice call.

Additionally, various systems and methods are described herein for charging for 2G/3G voice calls that are switched over a packet-switched core network. Also, various systems and methods are described herein for supporting both outbound and inbound roaming 2G/3G mobile devices.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Communications System

Figure 1:
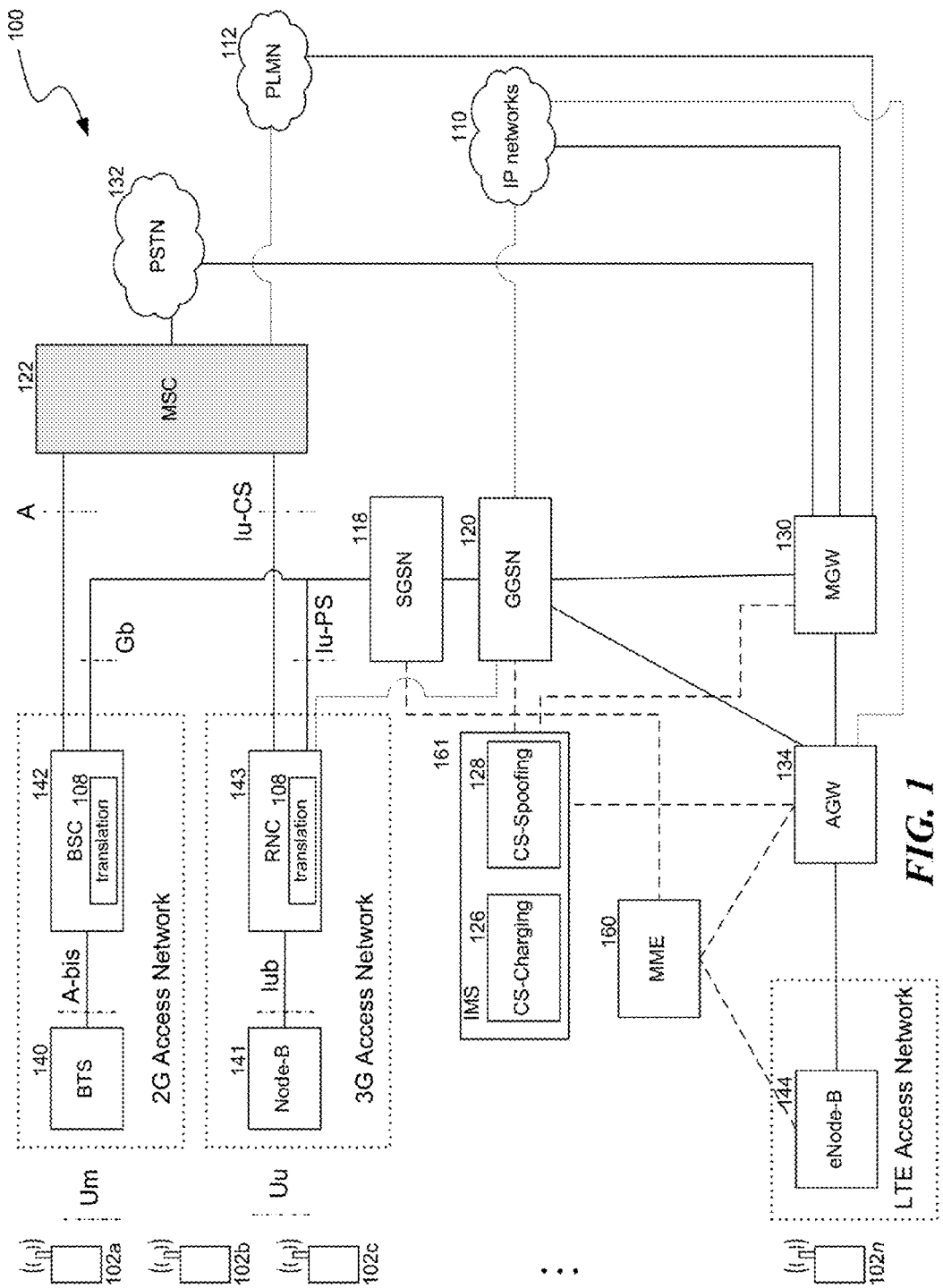
FIG. 1 illustrates a communications system that may employ an evolved packet-switched core network architecture for voice services on second- and third-generation access networks.

FIG. 1 illustrates a communications system 100 that may employ an evolved packet-switched core network architecture for voice services on second- and third-generation access networks. The communications system 100 includes mobile devices 102, a 2G (e.g., GSM) radio access network that comprises a base station (BTS) 140 and a Base Station Controller (BSC) 142, a 3G (e.g., UMTS) radio access network that comprises a Node-B 141 and a Radio Network Controller (RNC) 143, a Serving GPRS Support Node (SGSN) 118, a Gateway GPRS Support Node (GGSN) 120, an LTE radio access network that comprises an eNode-B 144, a Mobility Management Entity (MME) 160, an access gateway (AGW) 134, a media gateway (MGW) 130, and an IP Multimedia Subsystem (IMS) 161. As described herein, some examples of the communications system 100 may include a legacy mobile switching center (MSC) 122, while other examples may not. The communications system 100 may couple to one or more external networks such as a public switched telephone network (PSTN) 132, IP-based networks 110 such as the Internet and VOIP networks, and public land mobile networks (PLMN) 112, including circuit-switched PLMNs. Although not shown, the communications system 100 may also include various security components, e.g., between the GGSN 120 and IP networks 110, to protect the system from network attacks. While the communications system 100 is illustrated and described in terms of GSM/GPRS/EDGE/UMTS/LTE network components and architectures, the technologies described herein are not limited to such architectures. Any suitable communications system may employ aspects of the technology described herein.

Mobile devices 102 may include virtually any devices for communicating over a wireless network. Such devices include mobile telephones, such as Global System for Mobile Communications (GSM) telephones, Time Division Multiple Access (TDMA) telephones, Universal Mobile Telecommunications System (UMTS) telephones, Evolution-Data Optimized (EVDO) telephones, Long Term Evolution (LTE) telephones, Generic Access Network (GAN) telephones, Unlicensed Mobile Access (UMA) telephones, and other mobile computers or devices, such as Voice over Internet Protocol (VoIP) devices, Secure User-plane Location (SUPL) Enabled Terminals (SETs), Personal Digital Assistants (PDAs), handheld computers, laptop computers, wearable computers, tablet computers, pagers, integrated devices combining one or more of the preceding devices, and/or the like. As such, mobile devices may range widely in terms of capabilities and features. For example, a mobile telephone may have a numeric keypad, the capability to display only a few lines of text and be configured to interoperate with only GSM networks. However, other mobile devices (e.g., smart phones) may have a touch-sensitive screen, a stylus, an embedded GPS receiver, and a relatively high-resolution display and be configured to interoperate with multiple types of networks. Mobile devices may also include SIM-less devices (i.e., mobile devices that do not contain a functional subscriber identity module (SIM), roaming mobile devices (i.e., mobile devices operating outside of their home networks), and/or mobile software applications.

Users may employ mobile devices 102 to communicate with other users or devices, e.g., via voice calls, messaging, multimedia data communications, or otherwise. Mobile devices typically include a processing unit, volatile memory and/or nonvolatile memory, a power supply, one or more network interfaces, an audio interface, a display, a keypad or keyboard, a GPS receiver and/or other location determination component, and other input and/or output interfaces. The various components of mobile devices may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. In addition, the memories may be employed to store operational data, content, contexts, and/or the like. The memories may also store one or more applications configured to receive and/or provide messages to and/or from another device or component. These messages may also be displayed and/or stored on a mobile device. Such messages may include short message service (SMS) messages, multi-media message service (MMS) messages, instant messaging (IM) messages, enhanced message service (EMS) messages, rich communication service content, and/or any other content directed toward a user of mobile devices.

The various mobile devices 102 include "modified" and "unmodified" mobile devices. Unmodified mobile devices (102a, 102b, 102c), such as 2G/3G mobile devices, do not include a native VOIP application that is configured to provide native support of VOIP calls. In contrast, "modified" mobile devices (102d), such as 4G or LTE mobile devices, include a native VOIP application that is configured to provide native support of VOIP calls when a user initiates or receives a voice call. The user plane data and control signaling for a VOIP call on a modified mobile device may be transmitted entirely via packet-switched protocols, even at the air interface.

A BTS 140 and a Node-B 141 are each configured to provide a radio or air interface to mobile devices 102 under the control of BSC 142 and RNC 143, respectively. For example, the BTS may provide a GSM radio interface (Um) while Node-B provides a GPRS and/or UMTS radio interface (Uu). The BTS and Node-B typically include limited command and control functionality (e.g., retransmission) or no command and control functionality. Instead, the BSC and/or RNC provide such command and control functionality while the BTS and Node-B provide physical layer interfaces to associated mobile devices. BTSs and Node-Bs may be positioned at distributed locations to provide network coverage throughout a geographical area. In some examples, the node-B and RNC may be combined into a single device.

Figure 5:
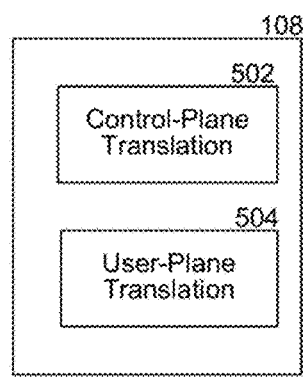
FIG. 5 shows a block diagram of a translation module.

As described in greater detail herein, the communications system 100 switches some or all voice calls terminating or originating at a mobile device roaming on the 2G or 3G radio access networks (a "2G/3G voice call") over a packet-switched core network. To facilitate packet-switching of 2G/3G voice calls, the BSC and/or RNC includes or is coupled to a translation module 108, which is described in greater detail herein. As shown in FIG. 5, the translation module 108 may comprise a control-plane translation module 502 configured to perform various translation tasks related to control plane signaling for voice calls and a user-plane translation module 504 configured to perform various translation tasks related to user-plane data for voice calls. Although not shown in FIG. 1, in some examples, such as systems that implement HSPA technologies such as Internet HSPA, the BTS may alternatively or additionally include a translation module.

The BSC 142 and RNC 143 are both coupled to the SGSN 118 over the Gb and Iu-PS interfaces, respectively. The SGSN distributes data packets to and from the mobile devices 102 in its service area. The SGSN also performs mobility management duties, authentication functions, and/or other tasks. The SGSN may maintain location and profile information for mobile devices registered with it, such as a current cell identifier and an address. The SGSN may detunnel packets (e.g., GPRS Tunneling Protocol (GTP) packets) from the GGSN 120 and tunnel IP packets to the GGSN.

The SGSN 118 is coupled to the GGSN 120. In some examples (e.g., where direct tunneling is supported), the RNC 143 may also couple directly to the GGSN 120. The GGSN provides packet-based interworking between the (1) 2G/3G networks and (2) packet-switched components and packet-switched networks, including IP-based networks 110 such as the Internet and VOIP networks, the IMS 161, the media gateway 130, the access gateway 134, and/or other system components. The GGSN performs various data routing functions as a mobile device 102 roams within the 2G and 3G access networks. To implement its routing functions, the GGSN may manage and assign IP addresses and may maintain the current SGSN address of a mobile device 102.

The GGSN 120 forwards incoming data packets addressed to a specific mobile device 102 that originated from another mobile device 102, another system component, or an external network to the specific mobile device. To do so, the GGSN may tunnel received packets to the SGSN 118 that services the specified mobile device. The GGSN may translate the Packet Data Protocol (PDP) address of received data packets into the access network address of the specified mobile device and send the packets to the SGSN that the specified mobile device is registered with. If direct tunneling is supported, the GGSN may directly tunnel received packets to an RNC 143 that services the specified mobile device.

The GGSN 120 also forwards data packets received from the SGSN 118, such as packets originating from a mobile device 102, BSC 142, or RNC 143, to another packet-switched network or component such as an IP network 110, the IMS 161, the media gateway 130, the access gateway 134, another GGSN 120, or other packet-switched system components. To do so, the GGSN may convert packets received from the SGSN into a PDP format (e.g., IP format) that is suitable for the destination and transmit the packets to the appropriate network or component. If direct tunneling is supported, the GGSN 120 may also forward data packets received from the RNC 143 to another packet-switched network or component.

An eNode-B 144 is employed as a consolidated LTE counterpart of the BTS 140, Node-B 141, BSC 142, and RNC 143. For example, the eNode-B provides low-level LTE radio interfacing and various command and control functionalities, including radio resource management.

The eNode-B 144 is coupled to the MME 160 and AGW 134. The dashed line connecting the MME to the eNode-B, AGW, and SGSN indicates that the MME provides control-plane signaling. The MME is a control point for the LTE access network that may provide functionalities within the LTE access networks that are analogous to the SGSN 118 and GGSN 120. The MME may track idle mode mobile devices 102 and provide paging functionalities. The MME may also implement bearer activation/deactivation, selecting an AGW for a particular mobile device, authentication, and authorization. An MME may be a MME as described by the System Architecture Evolution (SAE) standards available from the 3GPP such as by TS 33.401.

The AGW 134, which in some examples may comprise a serving gateway and packet data network gateway, routes user-plane packets to and from the eNode-B 144. The AGW acts as a mobility anchor for the user-plane during eNode-B handovers. The AGW may also act as a mobility anchor between the LTE access network and the 2G/3G access networks. The AGW may initiate paging when it receives downlink data for a mobile device 102. The AGW may also manage mobile device contexts, such as IP bearer service information and routing information. In some examples, the AGW is responsible for routing some or all traffic exchanged with IP networks 110. In some examples, the AGW may be collapsed with the GGSN 120 into a single device.

The MGW 130 connects the communications system 100 to external networks and acts as an exit and entry point for user-plane traffic, such as VOIP or data traffic exchanged with external networks. As part of its function, the MGW may provide transcoding services by converting digital media streams between different transmission and coding techniques. The MGW may also act as the anchor for mobility between 3GPP and non-3GPP networks, e.g., networks that utilize WiMAX and 3GPP2 technologies (not shown in FIG. 1).

The GGSN 120, AGW 134, and MGW 130 couple to the IMS 161. The dashed line connecting the IMS to these components indicates that the IMS provides control-plane signaling. The IMS permits mobile devices 102 roaming in the 2G, 3G, and LTE access networks to access multimedia, messaging, and voice applications and services. To do so, the IMS provides a control layer that isolates the access networks from the service layer. The IMS may comprise various Call Session Control Functions and other components that, inter alia, provide processing of SIP signaling packets in the IMS. The IMS may also include or be coupled to a Home Subscriber Server (HSS) (not shown). The basic functionalities of the IMS components are described by standards promulgated by the 3GPP, including 3GPP TS 23.002, version 9.5.0 Release 9, which is hereby incorporated by reference herein in its entirety. The IMS may also include a CS-charging module 126 configured to perform various functions to ensure that subscribers who use mobile devices on 2G/3G access networks are correctly charged for 2G/3G voice calls. The IMS may also include a CS-spoofing module 128 configured to perform various functions to interact with other PMLNs in order to support inbound and outbound roaming and other services. The CS-charging module and CS-spoofing module are both described in greater detail herein. In some examples, the IMS may not be an IMS as described by the 3GPP, but may be another network that is configured to control voice calls and/or data transfers using SIP- or IP-based protocols. In such examples, the SIP voice control network may perform its various control functionalities in accordance with some, but not all, aspects of 3GPP standards.

Conventional Circuit-Switched Voice Calls

In conventional 2G and 3G systems, a mobile terminated (MT) or mobile originated (MO) voice call is typically implemented using circuit-switched protocols and is switched via the MSC 122. To illustrate, in a conventional 3G UMTS system, when a user initiates a voice call on a mobile device 102, the mobile device 102 communicates over the air interface Uu to the Node-B 141 using circuit-switched protocols, including e.g., the frame protocol for user-plane data. The control for the call is provided by the MSC communicating with the RNC 143 using circuit-switched protocols over the Iu-CS interface. During the voice call, the user-plane voice data is typically routed between the RNC and the MSC over the Iu-CS interface using circuit-switched protocols, e.g. the frame protocol, but may be encapsulated in either ATM or IP. Such conventional approaches to voice call control and user-plane routing require the active participation of the legacy MSC. As described above, a mobile service provider must expend additional resources to maintain a legacy MSC, which increases operating and capital expenses. For 3G calls that use ATM or IP encapsulation, it is also necessary to translate back from the IP or ATM protocols.

Translation Module to Support Packet-Switching of 2G/3G Voice Calls

Although unmodified mobile devices 102 continue to use circuit-switched protocols at the air interface, some or all 2G/3G voice calls in the depicted communication system 100 are switched using a packet-switched core network comprised of the SGSN, GGSN and/or IMS. The packet-switched core network provides both control signaling and user-plane data routing for 2G/3G voice calls. By using a packet-switched core network to switch 2G/3G voice calls, the communications system does not need to include a separate legacy circuit-switched MSC 122 to support unmodified 2G/3G mobile devices. In some examples, the communications system may continue to switch some 2G/3G calls via the legacy MSC, for example to provide additional switching capacity that supplements the capacity of the packet-switched core network. In other examples, the MSC may be decommissioned entirely and the packet-switched core network may switch all 2G/3G voice calls.

During voice calls, unmodified mobile devices 102 interact with 2G/3G radio access networks using circuit-switched protocols at the air interface. In order to switch 2G/3G voice calls over a packet-switched core network without modifying mobile devices, a translation module 108 is introduced into the communications system 100 at the BSC 142 and/or RNC 143. The translation module is configured to provide both user-plane and control-plane translation functions between (1) an unmodified mobile device that utilizes circuit-switched protocols at the air interface during a voice call, and (2) the packet-switched core network that utilizes packet-switched protocols for both control-plane and user-plane data. During a 2G/3G voice call, the translation module bypasses the MSC 122 both in the user-plane and the control-plane. Instead, as described in greater detail herein, the translation module may route user-plane data through and exchange control signaling messages with the packet-switched core network. Although the translation module may frame and/or packetize previously encoded voice data as described in greater detail herein, the translation module does not need to modify the encoding of voice data.

Packet-Switching of User-Plane Voice Data for 2G/3G Voice Calls

The translation module 108 performs various translation functions to facilitate the transfer of user-plane data for 2G/3G voice calls via the packet-switched core network. On uplink, the translation module encapsulates uplink circuit-switched voice data (e.g., voice data in a circuit-switched frame protocol format) generated by the mobile device 102 into packet-switched format voice data packets (e.g., IP packets) and sends the generated packets to other system components. To illustrate, during a 2G/3G voice call, the following steps may occur. First, uplink user-plane voice data originates from a mobile device 102 that uses conventional 2G or 3G (e.g., GSM or UMTS) techniques to encode the voice signal. The mobile device sends the voice data over the air interface (i.e., Um or Uu interface) using conventional circuit-switched 2G or 3G air interface protocol stacks, e.g., a protocol stack that utilizes the frame protocol. Second, the circuit-switched format voice data is received by the BTS 140 or Node-B 141. The BTS or Node-B forwards the received voice data to the BSC 142 or RNC 143, over the Abis or Iub interface, respectively, using protocol stacks, e.g., the defined 2G/3G protocols. Third, when the BSC or RNC receives the circuit-switched format voice data, the translation module 108 converts the received data from a circuit-switched format (e.g., frame format) into a packet-switched format (e.g. IP packet format). For example, the translation module may encapsulate the circuit-switched format data into packet-switched format data as described in U.S. patent application Ser. No. 10/380,790, titled "Transmission of Voice Over Packet-Switched Systems," filed Mar. 14, 2003, now U.S. Patent Application Publication No. 2004/0029615, which is hereby incorporated herein in its entirety. Fourth, the voice data packets generated by the translation module 108 are then forwarded to the SGSN 118 and then to the GGSN 120 using packet-switched protocols. Alternatively, the voice packets generated by the translation module may be directly forwarded from an RNC 143 (or combination RNC/node-B) to the GGSN 120, bypassing an SGSN. Fifth, the GGSN and/or the MGW 130 forwards the voice data packets to the network on which the intended recipient (i.e., the other party on the call) is located. For example, the GGSN may forward the packets to the MGW 130, which in turn forwards the voice data in the packets to a recipient that is located on a PSTN 132, a different PLMN 112, an IP network 110, or the LTE access network. The MGW may also perform transcoding on the packets prior to forwarding the voice data, e.g., if the recipient is on a PSTN. Alternatively, the GGSN may forward the packets to a different GGSN, SGSN, BSC, RNC (or combined RNC/node-B), AGW 134, or IP networks 110 using packet-switched protocols.

On downlink, the translation module 108 converts or unencapsulates downlink packet-switched voice data (e.g., VOIP packets) received from the packet-switched core network into a circuit-switched format (e.g., frame formatted voice data). To illustrate, on downlink, the following steps may occur. First, the GGSN 120 receives packet-switched voice data directed to the mobile device 102 from the other party to the call via packet-switched protocols (e.g. IP protocols). The voice packets may be received from the MGW 130, another GGSN 120 or SGSN 118, AGW 134, IP networks 110 (e.g., a VOIP network), or another system component. Second, using packet-switched protocols, the GGSN forwards the received packets to the correct SGSN or RNC (or combined RNC/node-B) to which the mobile device is attached. In turn, the SGSN forwards the voice packets to the BSC 142 or RNC 143 over the Gb or Iu-PS interfaces, respectively, using packet-switched protocol stacks. Third, the translation module 108 then converts the received voice data packets (e.g. VOIP packets) to circuit-switched format voice data (e.g. frame format). Fourth, the module sends the circuit-switched format voice data (e.g. voice frames) to the BTS 140 or Node-B 141 using circuit-switched protocols. Fifth, the BTS or Node-B transmits the circuit-switched format voice data to the mobile device using the defined protocols, e.g., conventional circuit-switched 2G or 3G air interface protocol stacks.

Control Signaling for 2G/3G Voice Calls Over a Packet-Switched Core Network

The translation module 108 may also perform various translation functions to facilitate the control signaling for a 2G/3G voice call. As described in greater detail with respect to FIGS. 2 and 3, the translation module may intercept a circuit-switched format signaling message originating from the mobile device via circuit-switched protocols, interpret the circuit-switched message, generate a packet-switched format signaling message (e.g., a SIP message) that is related to or analogous to the received circuit-switched message, and send the generated packet-switched signaling message to the IMS or another component using packet-switched protocols. Similarly, the translation module may also intercept a packet-switched format signaling message originating from the IMS or another component via packet-switched protocols, interpret the packet-switched message, generate an analogous or related circuit-switched format signaling message, and send the generated message to the mobile device via the radio access network using circuit-switched protocols. Since the translation module performs translation functions (e.g., between circuit-switched signaling messages and SIP messages), legacy 2G/3G mobile devices do not need an installed SIP application or any other modifications in order to provide signaling for a 2G/3G voice call. Instead, the packet-based switching of a voice call is transparent to the mobile device. Additionally, since the translation module performs translation functions, the SGSN and GGSN do not need modifications in order to switch 2G/3G voice calls. The various control-plane functionalities of the translation module are illustrated further herein with respect to FIGS. 2 and 3.

Figure 2:
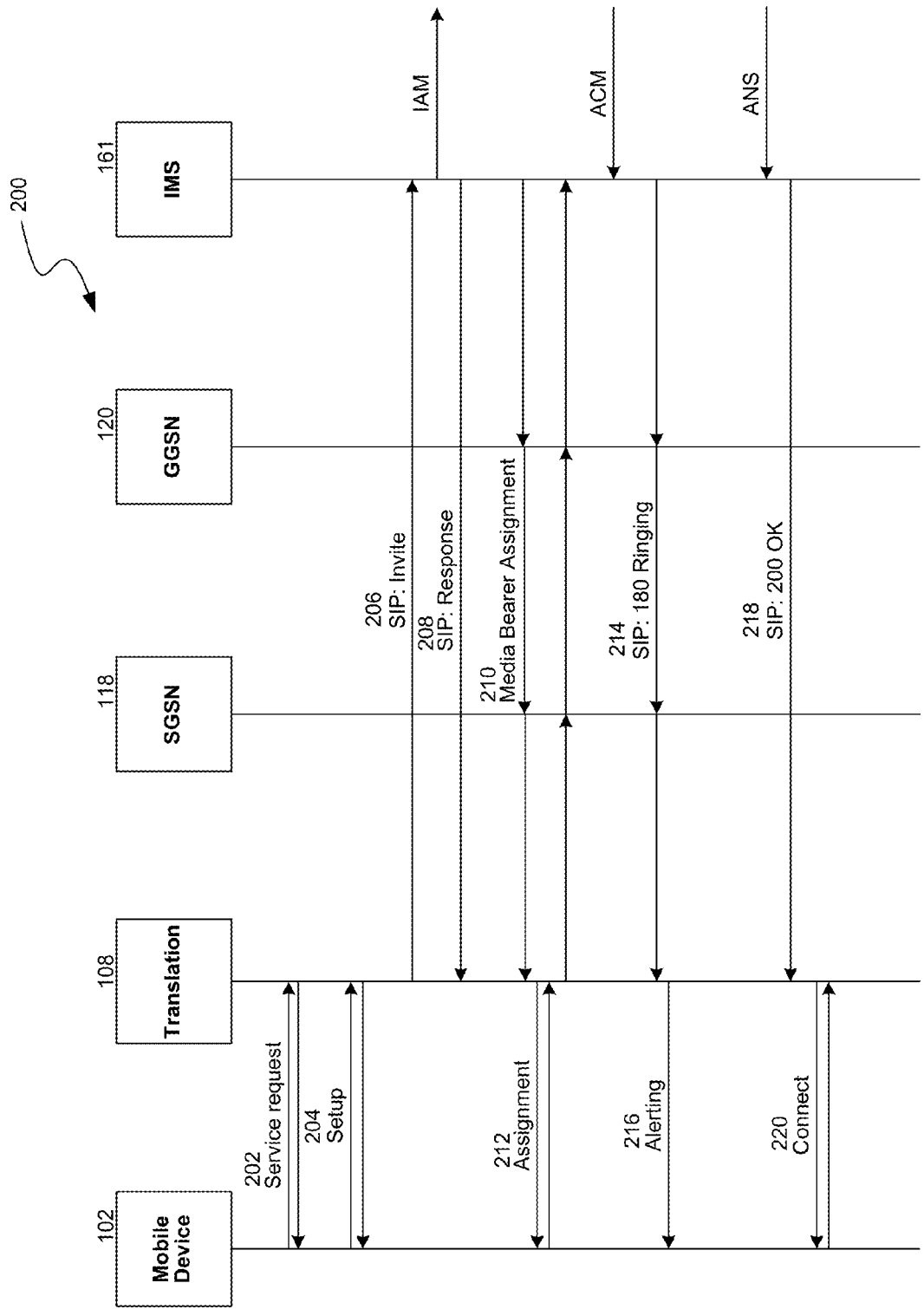
FIG. 2 shows a simplified flow diagram of the control signaling for a call setup process for a mobile-originated 2G/3G voice call.

FIG. 2 shows a simplified flow diagram of the control signaling for a call setup process 200 for a mobile-originated (MO) 2G/3G voice call. The call setup process 200 begins at step 202, when the mobile device 102 sends a circuit-switched Service request message to and receives a circuit-switched response from the translation module 108 located at the RNC 143 or BSC 142. At step 204, the mobile device then sends a circuit-switched Setup message to and receives a circuit-switched response from the translation module. Although not shown in FIG. 2, the translation module establishes a packet-switched signaling bearer for SIP signaling, mobility management and authentication. At step 206, the translation module sends a packet-switched SIP Invite message to the IMS 161, which triggers the IMS to send an Initial Address Message (IAM) to the PSTN 132. At step 208, the IMS sends the translation module a packet-switched SIP Response message, which may include or otherwise indicate an IP address and/or another address associated with the recipient of the call (a "destination address"). The destination address may also be indicated to the translation module by a different SIP message. The translation module maps or associates the call's session to the destination address, e.g., by storing the destination address in a local session table. Moreover, at different points after the initiation of the call, e.g., during RNC and/or node-B handoffs of a destination mobile device, the translation module may receive an indication of a different address (e.g., IP address or other address) associated with the recipient of the call and may update its stored destination address to reflect the new, different address. At step 210, the IMS initiates a packet-switched media bearer assignment for the call, via the GGSN 120, SGSN 118 and translation module. The packet-switched media bearer assigned is typically separate from the packet-switched SIP signaling bearer, and may have stringent quality-of-service (QoS) parameters (e.g., a QoS parameter suitable for voice conversation) or other bearer parameters suitable for a voice call. To ensure sufficient call quality for example, the media bearer may have a higher QoS than the packet-switched signaling bearer or the signaling bearers used for non-voice data. At step 212, the translation module initiates a radio bearer assignment with the mobile device using circuit-switched protocols. The translation module then triggers the completion of the packet-switched media bearer assignment. When an Address Complete Message (ACM) is received from the PSTN, the IMS sends a packet-switched SIP: 180 Ringing message to notify the translation module. In turn, at step 216, the translation module notifies the mobile device by sending a circuit-switched Alerting message. Once an Answer Message (ANS) is received from the PSTN, the IMS notifies the translation module via a packet-switched SIP: 200 OK message. In turn, the translation module sends a circuit-switched Connect message to the mobile device, which responds with circuit-switched acknowledgment.

Figure 3:
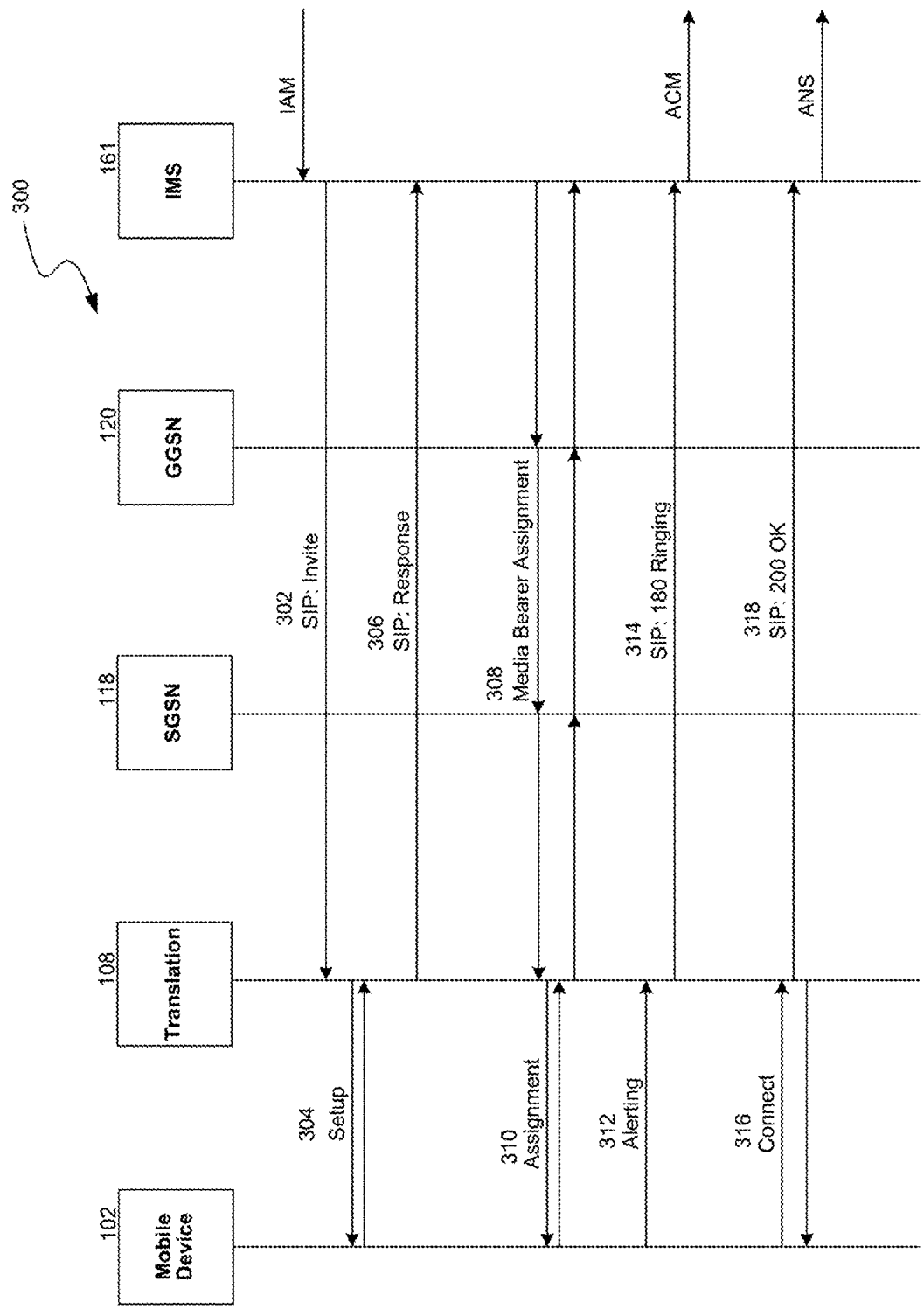
FIG. 3 shows a simplified flow diagram of the control signaling for a call setup process for a mobile-terminated 2G/3G voice call.

FIG. 3 shows a simplified flow diagram of the control signaling for a call setup process 300 for a mobile-terminated (MT) 2G/3G voice call. The call setup process 300 begins at step 302, when in response to receiving an IAM message from the PSTN, the IMS 161 sends a packet-switched SIP: Invite message to the translation module 108 at the RNC 143 or BSC 142. The Invite message (or another SIP message from the IMS) may indicate a destination address. The translation module may take various steps to store the destination address (e.g., in association with the call's session) and to update the stored destination address at various points during the call, as previously described. Although not shown in FIG. 3, the translation module may also establish a packet-switched signaling bearer for SIP signaling, mobility management and authentication. At step 304, the translation module then sends a circuit-switched Setup message to and receives a circuit-switched response from the mobile device 102. Next, at step 306, the translation module sends a packet-switched SIP Response message to the IMS. At step 308, the IMS initiates, via the GGSN 120, SGSN 118 and translation module, a packet-switched media bearer assignment for the call. The packet-switched media bearer assigned is typically separate from the SIP signaling bearer, and may, for example, have stringent QoS bearer parameters as previously described. At step 310, the translation module initiates a circuit-switched radio bearer assignment with the mobile device. Then the translation module completes the packet-switched media bearer assignment. At step 312, the mobile device sends a circuit-switched Alerting message to the translation module. In response, the translation module sends a packet-switched SIP: 180 Ringing message to the IMS, which in turn sends an Address Complete Message (ACM) to the PSTN. At step 316, the mobile device sends a circuit-switched Connect message to the translation module. At step 318, the translation module sends a packet-switched SIP: 200 OK message to the IMS, which then sends an Answer Message (ANS) to the PSTN. The translation module also responds to the circuit-switched Connect message received from the mobile device.

As illustrated by FIGS. 2 and 3, since the translation module 108 translates control-plane messages, the mobile devices 102 do not need to deviate from conventional circuit-switched 2G or 3G signaling behavior in order to make a voice call that is switched on a packet-switched core network. Instead, the mobile device continues to perform as it would in a conventional 2G or 3G system, by using conventional circuit-switched signaling protocols to communicate with the BTS 140 or Node-B 141 over the air interfaces, Um or Uu. For example, the mobile devices may continue to send and receive Direct Transfer Application Sub-Part (DTAP) messages. Therefore, legacy 2G/3G mobile devices do not need modifications, such as an installed SIP application, to make a voice call that is switched on a packet-switched core network.

The processes 200 and 300 also highlight several examples of how the communications system 100 diverges from the voice call setup used in conventional 2G/3G circuit-switched systems. As a first example, the IMS 161, and not the MSC 122 manages the setup of the voice call. As another example, the system 100 uses a packet-switched mode for mobility management with messages sent between the mobile device 102 and the SGSN, instead of between the mobile device and the MSC 122. As yet another example, the network, rather than the mobile device 102, initiates media bearer activation.

To implement the processes 200 and 300, the GGSN 120, SGSN 118, BSC 142, and RNC 143 may implement a packet-switched paging mechanism. Additionally, routing areas and BSCs/RNCs may be aligned. In some examples, discrete access point names ("APN") are used, with separate packet-switched bearers for voice and for signaling.

FIGS. 2 and 3 do not show all signaling steps that would be performed during a 2G/3G voice call. For example, these figures do not show the signaling steps needed to terminate a voice call. However, the translation module 108 may similarly intercept and translate any other signaling messages related to a 2G/3G voice call, not just those shown in FIGS. 2 and 3. Furthermore, although FIGS. 2 and 3 show signaling flows diagrams for a 2G/3G voice call with a party on a PSTN 132, the call could be directed to or received from another mobile device on the same communications system or a different PLMN 112, or from any other type of device (such as a VOIP client), without departing substantially from the steps shown in FIGS. 2 and 3.

Charging for 2G/3G Voice Calls Over a
Packet-Switched Core Network

Figure 4:
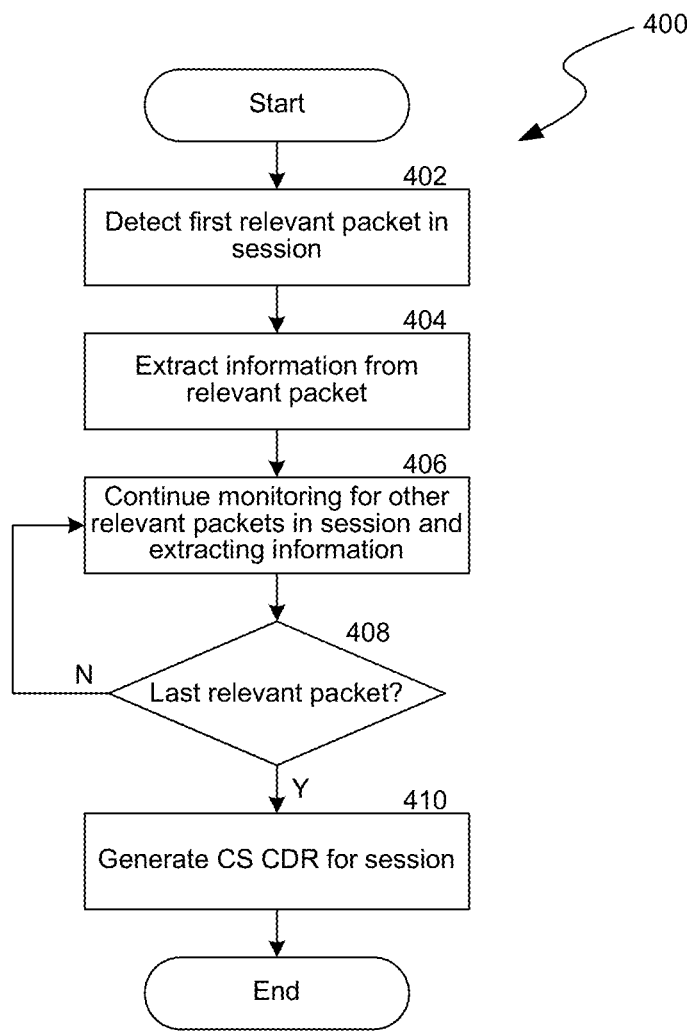
FIG. 4 shows a process for charging for a 2G or 3G voice call that is switched via a packet-switched core network.

FIG. 4 shows a process 400 for charging for a 2G or 3G voice call that is switched via a packet-switched core network. The process 400 is described as being performed by the CS-charging module 126, however, it may also be performed by other system components or in other systems. The process 400 begins at block 402, when the CS-charging module detects the first relevant packet in a 2G/3G voice call session that is being packet-switched via the packet-switched core network. A packet is relevant to voice call charging if it provides information that either directly or indirectly forms a basis for how a mobile service provider charges a user for a voice call. A relevant packet may be generated by the IMS 161 or received by the IMS (e.g., from the RNC 143 or BSC 142). The "first" relevant packet is an initial relevant packet sent or received during call setup, and may, for example, provide an indication of the time at which a voice call was initiated or set up. For example, if a mobile service provider charges a user on the basis of when a call is connected, the first relevant packet may carry a SIP: 200 OK message, such as the message shown at steps 218 and 318, since these are sent or received in close temporal proximity to a circuit-switched Connect message. In other approaches of charging, the first relevant packet may occur at any other steps shown in FIGS. 2 and 3 or call setup steps that are not shown in the Figures. For example, if a service provider's customers are charged even for calls that go unconnected (e.g., unanswered), the packet carrying a SIP: Invite or SIP: Response message may be the first relevant packet.

At block 404, the CS-charging module 126 extracts information from the packet that is relevant to charging, either directly or indirectly. For example, the CS-charging module may determine the time that a packet (e.g. a SIP 200 OK packet) was received or generated, e.g., in order to indirectly estimate the time that a call was initiated or connected. As another example, the CS-charging module may determine characteristics of the voice call that will be used as a basis for charging for the call, such as a destination phone number that will dictate the rate for the voice call, or a cell identifier that indicates the mobile device's current location and/or time zone. To perform the extraction, the CS-charging module may immediately or subsequently (e.g., at block 410) utilize a session identifier or other information within the packet to look up characteristics of the voice call session, e.g., in a session table. Other system components may perform such a lookup at the request of the CS-charging module.

At block 406, the CS-charging module 126 continues to monitor for other relevant packets in the voice call session and continues to extract information from the other packets, as described herein.

At decision block 408, the CS-charging module 126 determines if the last relevant packet has already been received. For example, the CS-charging module may determine that a SIP Bye message (or a response to a Bye message) has been sent or received, indicating that the call is being terminated. If the last relevant packet has been received, the process 400 proceeds to block 410, otherwise, it returns to block 406.

At block 410, the CS-charging module 126 generates a charging data record (CDR) for the voice call that contains information related to charging the user for the voice call. The generated CDR provides sufficient information such that a conventional circuit-switched charging schema could be applied to charge a subscriber for the call. Conventional schemas include charging for a voice call based on the call's duration instead of the quantity of packet-switched voice data that is transferred during the call. In some examples, the CDR may indicate the start time, end time, billable duration, start location, end location, origin/destination IP address, supplementary services utilized during a call which may be indicated by extended codes (e.g., call waiting, three-way calling, etc.), the original destination number dialed, and a connected-to number. It will be appreciated that a CDR that is generated for a voice call will therefore typically differ from a CDR that is generated for a web browsing session, even though the same packet-switched core network is utilized and the same quantity of data may be transmitted via that network.

Additionally, at block 410, or at another time, the CS-charging module or another system component may take corrective steps to ensure that a subscriber is not over-charged for the packet-switched data that is exchanged during the voice call. For example, if the subscriber has both a voice call service plan and a data service plan, the subscriber may receive a credit against his data service plan to account for the volume of data packets that were transferred during the call. As another example, the CS-charging module or another system component might take a different action to ensure that the packets associated with the voice call are not charged against the subscriber's data plan. Otherwise, without such corrective action, the subscriber might be over-charged for the call, if in addition to being charged for a voice call in accordance with the CDR (e.g., on a per-minute basis), he is also charged for the data packet transfers under his data plan (e.g., on a per-kilobyte basis).

In some examples, during the process 400, the CS-charging module 126 may also detect and utilize packets that contain information that is relevant to the mobile service provider's recordkeeping processes, even if the information will not be used for charging purposes. For example, a mobile service provider might not charge its users for unconnected voice calls but may track the occurrence of unconnected voice calls for recordkeeping purposes. In such an example, the CS-charging module may detect all packets that are relevant to both charging and/or unconnected calls and use these packets to generate a CDR and/or similar records.

In some examples, the RNC 143, BSC 142 and/or IMS 161 may embed additional charging or other relevant information into control-plane packet-switched (e.g., SIP) messages related to call management, authentication, mobility management, or similar primary control-plane tasks; the extra information embedded is not necessary to perform the primary control-plane task. During the process 400, the additional information may be extracted and utilized by the CS-charging module 162. For example, the RNC or BSC may embed information into a SIP: Invite message (or a response thereto) indicative of a time zone. Additionally or alternatively, some or all of the relevant packets detected and utilized during the process 400 may be generated by the RNC or BSC solely to facilitate charging functions, not other control-plane tasks.

Although the process 400 has primarily described the detection and use of control-plane packets for charging, in some examples, during the process 400, the CS-charging module 162 may additionally or alternatively detect and utilize user-plane packets carrying voice payload data.

Roaming

The communications system may include a CS-spoofing module 128 to facilitate outbound and inbound roaming of 2G/3G mobile devices. The module performs various translation tasks so that the communications system 100 externally appears to mimic the mobility management and other core procedures that would normally be implemented in a conventional circuit-switched 2G or 3G core network, such as an MSC 122. These translation tasks may include (1) accepting, interpreting, and responding to incoming control-plane messages received from other communications systems, including messages related to mobility management, and (2) sending outgoing control-plane messages to other communications systems, including messages related to mobility management. As one example, when a subscriber of the mobile service provider that operates the communications system 100 roams into a different visited communications system, the CS-spoofing module in the subscriber's home communications system may be configured to receive, interpret, and respond to messages from the visited network that request subscription information for the subscriber. When responding, the CS-spoofing module may use a messaging format that spoofs or mimics the signaling of a 2G or 3G core network, e.g., the MSC 122. As another example, when a subscriber of the operator of a different communications system, e.g., a different PLMN, roams into the communications system 100, the CS-spoofing module may be configured to send a request for subscription information for the mobile device 102 using a messaging format that spoofs or mimics the signaling of a 2G or 3G core network, e.g., the MSC 122.

Additionally, the CS-spoofing module 128 may perform various translation tasks to support authentication, profile translation, emergency services support, and/or translation of other services of the home network. The CS-spoofing module may also support extended services for 2G/3G voice calls that are not typically available for circuit-switched voice calls.

CONCLUSION

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps, or employ systems having steps, in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While certain aspects of the invention are presented below in certain claim forms, the applicant contemplates the various aspects of the invention in any number of claim forms. Accordingly, the applicant reserves the right to add additional claims after filing the application to pursue such additional claim forms for other aspects of the invention.

We claim:

1. A method in a communications system of charging for a voice call on a mobile device, the method comprising:
   detecting, at a Session Initiation Protocol (SIP) voice control network, packets related to signaling for a voice call on a mobile device that is associated with a subscriber of a mobile service provider,
      wherein the detected packets indicate information that forms a basis for the mobile service provider to charge the subscriber for the voice call,
      wherein, during the voice call, the mobile device uses circuit-switched protocols to send and receive voice data and signaling for the call over an air interface to the communication system;
using the detected packets to extract information that forms a basis for the mobile service provider to charge the subscriber for the voice call; and,
generating a charging data record for the voice call from the extracted information.

2. The method of claim 1, wherein the SIP voice control network is an IP Multimedia Subsystem.

3. The method of claim 1, further comprising taking corrective action to ensure that the subscriber is not charged for the voice call under a data plan subscription.

4. The method of claim 1, wherein the information that forms a basis for the mobile service provider to charge the subscriber for the voice call comprises a destination phone number, a cell identifier that indicates a location of the mobile device, or a cell identifier that indicates a time zone associated with the mobile device.

5. The method of claim 1, wherein the information is extracted by using a session identifier or other information within one of the detected packets to identify one or more characteristics of the voice call.

6. The method of claim 1, wherein the charging data record indicates a start time of the voice call, an end time of the voice call, a billable duration of the voice call, a start location of the voice call, or an end location of the voice call.

7. The method of claim 1, further comprising:
detecting, at the SIP voice control network, one or more packets containing information that is relevant to one or more recordkeeping processes of the mobile service provider; and
generating a charging data record for the voice call from information detected in the one or more packets containing information that is relevant to the one or more recordkeeping processes of the mobile service provider.

8. A communications system for charging for a voice call on a mobile device, the system comprising:
a memory storing computer executable instructions of:
a charging module configured to:
detect, at a Session Initiation Protocol (SIP) voice control network, packets related to signaling for a voice call on a mobile device that is associated with a subscriber of a mobile service provider,
wherein the detected packets indicates information that forms a basis for the mobile service provider to charge the subscriber for the voice call,
wherein, during the voice call, the mobile device uses circuit-switched protocols to send and receive voice data and signaling for the call over an air interface to the communication system;
use the detected packets to extract information that forms a basis for the mobile service provider to charge the subscriber for the voice call; and,
generate a charging data record for the voice call from the extracted information.

9. The system of claim 8, wherein the information that forms a basis for the mobile service provider to charge the subscriber for the voice call comprises a destination phone number, a cell identifier that indicates a location of the mobile device, or a cell identifier that indicates a time zone associated with the mobile device.

10. The system of claim 8, wherein the information is extracted by using a session identifier or other information within one of the detected packets to identify one or more characteristics of the voice call.

11. The system of claim 8, wherein the charging data record enables charging for the voice call based on the duration of the voice call and not based on a quantity of packet-switched voice data that is transferred during the voice call.

12. The system of claim 8, wherein the charging data record indicates an originating Internet Protocol (IP) address of the voice call, a destination IP address of the voice call, an indication of one or more supplementary services used during the voice call, the original destination number of the voice call, or a connected-to number of the voice call.

13. The system of claim 8, wherein the charging module is further configured to:
detect, at the SIP voice control network, one or more packets containing information that is relevant to one or more recordkeeping processes of the mobile service provider; and
generate a charging data record for the voice call from information detected in the one or more packets containing information that is relevant to the one or more recordkeeping processes of the mobile service provider.

14. At least one computer-readable medium, excluding transitory signals and containing instructions, that when executed by a processor, perform a method in a communications system of charging for a voice call on a mobile device, the method comprising:
detecting, at a Session Initiation Protocol (SIP) voice control network, packets related to signaling for a voice call on a mobile device that is associated with a subscriber of a mobile service provider,
wherein the detected packets indicate information that forms a basis for the mobile service provider to charge the subscriber for the voice call,
wherein, during the voice call, the mobile device uses circuit-switched protocols to send and receive voice data and signaling for the call over an air interface to the communication system;
using the detected packets to extract information that forms a basis for the mobile service provider to charge the subscriber for the voice call; and,
generating a charging data record for the voice call from the extracted information.

15. The computer-readable medium of claim 14, further comprising taking corrective action to ensure that the subscriber is not charged for the voice call under a data plan subscription.

16. The computer-readable medium of claim 14, wherein at least one of the detected packets indicates information regarding a time at which the voice call is initiated or set up.

17. The computer-readable medium of claim 14, wherein the information that forms a basis for the mobile service provider to charge the subscriber for the voice call comprises a destination phone number, a cell identifier that indicates a location of the mobile device, or a cell identifier that indicates a time zone associated with the mobile device.

18. The computer-readable medium of claim 14, wherein the charging data record enables charging for the voice call based on the duration of the voice call and not based on a quantity of packet-switched voice data that is transferred during the voice call.

19. The computer-readable medium of claim 14, wherein the charging data record indicates a start time of the voice call, an end time of the voice call, a billable duration of the voice call, a start location of the voice call, an end location of the voice call, an originating Internet Protocol (IP) address of the voice call, a destination IP address of the voice call, an indication of one or more supplementary services used during the voice call, the original destination number of the voice call, or a connected-to number of the voice call.

20. The computer-readable medium of claim 14, further comprising:
   detecting, at the SIP voice control network, one or more packets containing information that is relevant to one or more recordkeeping processes of the mobile service provider; and
   generating a charging data record for the voice call from information detected in the one or more packets containing information that is relevant to the one or more recordkeeping processes of the mobile service provider.

\* \* \* \* \*